United States Patent
Van Cleve

(10) Patent No.: US 6,634,241 B1
(45) Date of Patent: Oct. 21, 2003

(54) METHOD AND APPARATUS FOR BONDING A CONNECTING RING TO A FLOW TUBE AND BALANCE BAR OF A CORIOLIS FLOWMETER

(75) Inventor: Craig Brainerd Van Cleve, Lyons, CO (US)

(73) Assignee: Micro Motion, Inc., Boulder, CO (US)

( * ) Notice: Subject to any disclaimer, the term of this patent is extended or adjusted under 35 U.S.C. 154(b) by 35 days.

(21) Appl. No.: 09/668,559

(22) Filed: Sep. 22, 2000

(51) Int. Cl.[7] ................................................. G01F 1/78
(52) U.S. Cl. .................................................. 73/861.357
(58) Field of Search ....................... 73/861.554–861.557

(56) References Cited

U.S. PATENT DOCUMENTS

| | | | |
|---|---|---|---|
| 5,344,717 A | * | 9/1994 | Dutton, Jr. et al. ... 73/861.38 X |
| 5,691,485 A | | 11/1997 | Endo et al. |
| 5,979,246 A | | 11/1999 | Van Cleve et al. |

FOREIGN PATENT DOCUMENTS

WO  WO 00/47956  8/2000

* cited by examiner

*Primary Examiner*—Hezron Williams
*Assistant Examiner*—C Dickens

(74) *Attorney, Agent, or Firm*—Duft Setter Ollila & Bornsen LLC

(57) ABSTRACT

A Coriolis flowmeter having a single flow tube surrounded by connecting rings and a balance bar whose ends are connected by the connecting rings to the flow tube. The balance bar has a thermal coefficient of expansion greater than that of the connecting rings and the flow tube. The outer circumferential surface of each connecting ring is tapered toward the axial center of the flow tube. The inner circumferential surface of the balance bar has a taper matching that of the connecting ring. The connecting ring can only partially inserted into the space between the flow tube and the balance bar when the assembly is at room temperature. Braze material is then applied to the visible ends of the surface common to the balance bar and the connecting rings as well as to the ends of the surface common to the connecting rings and the flow tube. The structure is heated to brazing temperature to braze these common surfaces. The greater thermal coefficient of expansion of the balance bar enables the tapered connecting rings to be fully inserted into the space between the balance bar and the flow tube so that the outer ends of the connecting rings are coplanar with the ends of the balance bar. Another embodiment has a step on the inner surface of the balance bar that limits the inward axial travel of the connecting rings. Another embodiment has an annular ring between the flow tube and the connecting ring to reduce the peak stress.

13 Claims, 12 Drawing Sheets

METHOD AND APPARATUS FOR BONDING A CONNECTING RING TO A FLOW TUBE AND BALANCE BAR OF A CORIOLIS FLOWMETER

FIELD OF THE INVENTION

This invention relates to a connecting ring for Coriolis flowmeter and in particular to a method and apparatus that enables the bonding of Coriolis flowmeter elements having different thermal coefficients of expansion.

Problem

Single tube Coriolis flowmeters typically have a balance bar surrounding a flow tube and intermediate annular connecting rings that couple each end of the balance bar to the flow tube. The connecting rings are often affixed to the balance bar and the flow tube by a brazing process in order to provide a rigid and permanent connection. The integrity of the braze joints is important because, in operation, the balance bar and the material filled flow tube are vibrated in phase opposition. The flow tube vibration is necessary to produce the Coriolis acceleration on the flowing material and the balance bar vibration is necessary to counterbalance the vibrating flow tube. The connecting rings and their braze joints ensure that the flow tube, the connecting rings and the balance bar define an integral dynamically balanced structure. If the joints are not of high and consistent integrity, the balance of the vibrating structure can be impaired along with the accuracy of the flowmeter.

Flaws in the braze joints can also reduce the life of a flowmeter. The location of the joints between the oppositely vibrating balance bar and material filled flow tube puts the braze joints in a region of high stress. Furthermore, the stress is cyclic and reverses sign with every vibration cycle. Flawed or incomplete braze joints tend to have geometries which concentrate and increase the cyclic stress. The stress can even be elevated to the point where it causes fatigue cracking and failure of the meter. It can thus be seen that the connecting rings and the brazes constitute critical elements in the successful operation of a Coriolis flowmeter.

Prior art meters have traditionally been brazed by an operation in which the cylindrical balance bar is placed over the flow tube and then the annular connecting rings are placed over the flow tube and into the ends of the balance bar. Braze material is applied to the surfaces that couple the connecting ring to the balance bar and flow tube. The structure is then placed in a oven and heated to approximately 800° C. The braze material melts and flows by capillary attraction into the small clearances separating the flow tube, connecting ring, and balance bar. The structure is then cooled and braze material solidifies to form an integral structure comprising the balance bar, connecting ring, and flow tube.

The brazing process is well suited for applications in which similar material is used for the flow tube, connecting ring, and balance bar. These elements are machined prior to the brazing operation so that an optimum clearance (gap) of approximately 0.005 cm exist between the surfaces to be bonded. This gap is sufficiently small that the capillary attraction overcomes the force of gravity and sucks the liquid braze material into the gap rather than allowing it to run down the flow tube and balance bar. Upon cooling an integral solid structure is formed.

The braze process using the prior art component design, however, is not well suited for the bonding of materials having different thermal coefficients of expansion. This is a problem because it is necessary to make the flow tube of titanium for performance reasons. Titanium is very expensive and difficult to weld and fabricate. Therefore, for reasons of economy, a stainless steel balance bar is preferred. Stainless steel has a thermal expansion coefficient that is approximately twice that of titanium. When the components are heated in the brazing furnace the stainless steel balance bar expands twice as much as the titanium flow tube and connection rings. At brazing temperature this differential expansion opens the gaps between the titanium and stainless steel parts so that the capillary attraction is no longer sufficient to hold the braze material in the gaps.

For an example, let it be assumed that the parts are machined to have a 0.005 cm gap at room temperature. At brazing temperature (800° C.) the gap between the outside of the titanium flow tube and the inside of the titanium connecting ring does not change significantly because they both expand the same amount. However, the gap between the outside of the titanium connecting ring and the inside of the stainless steel balance bar increases at brazing temperature. Titanium expands at approximately $7.2\times10^{-6}$ cm/cm/° C. while stainless steel expands at approximately $16.2\times10^{-6}$ cm/cm/° C. The difference in expansion rate is thus $9\times10^6$ cm/cm/° C. Assuming that the cylindrical surfaces to be brazed have a diameter of 2.54 cm, when the structure is heated to the brazing temperature of 800° C, the inside surface of the balance bar expands 0.0177 cm more than the outside surface of the connecting ring. The gap produced by the differential expansion is added to the original clearance of 0.005 cm to produce a gap of 0.023 cm at brazing temperature. This 0.023 cm gap is not suitable for a successful brazing operation since the capillary attraction is not sufficiently strong to prevent the liquid braze material from running out of the joint. Furthermore, if the parts are not fixtured with extreme precision, the gap is likely to become 0.046 cm on one side and zero on the other as the connecting ring moves to one side in the balance bar bore. This lack of concentricity can result in a braze that extends only partly around the circumference of the intended braze surface. The result is a defective braze joint between the flow tube and connecting ring when the structure is cooled.

Attempts have been made in the prior art to overcome the problem of brazing a titanium flow tube and to a non-titanium balance bar. These efforts include the use of threaded braze surfaces to couple the elements together. This is not satisfactory since threading of the parts is expensive and the materials still expand at different rates so that outer threads on the connecting ring would not be tightly coupled to inner threads on the balance bar resulting in loss of concentricity and the possibility of partial brazes.

For the above and other reasons it is a problem in the art of Coriolis flowmeter construction to reliably and inexpensively braze materials having different thermal expansion coefficients. In particular it is difficult to provide an integral structure wherein non-titanium balance bars are reliably brazed to titanium flow tubes and titanium connecting rings. In the above discussion it is assumed that the flow tube and connecting rings are titanium and that the balance bar is made of material such as stainless steel or other material having a higher thermal coefficient of expansion. A similar problem arises when the flow tube is made of titanium and the connecting rings and balance bar are made of stainless steel or when any of the parts to be brazed has a thermal expansion coefficient different than any other of the parts.

Solution

The above and other problems are solved and an advance in the art is achieved by a method and apparatus provided by the present invention. The present invention relates to a Coriolis flowmeter that has a geometry such that the connecting ring can be inexpensively and reliably brazed to a flow tube and balance bar of dissimilar materials. In a typical application of the apparatus and method of the present invention, a titanium connecting ring is brazed to a balance bar formed out of material having a much higher coefficient of expansion such as stainless steel.

The titanium connecting ring has a radially inner braze joint with the titanium flow tube. The connecting ring surface of this joint is axially parallel to the outer surface of the flow tube. Put simply, the inner braze surface of the connecting ring and the outer braze surface of the flow tube are cylindrical as in the prior art. Since the flow tube and the connecting ring are both formed of titanium, they have the same expansion coefficient so that the braze clearance or gap between them does not change with temperature. The stainless steel balance bar, however, has a much higher thermal expansion coefficient. To accommodate the difference in expansion coefficients, a tapered outer surface of the connecting ring mates with a matching tapered inner surface of the balance bar. The tapers of both parts are of the same angle. Both parts have the decreasing radius towards the axial center of the flow tube.

The assembly of the parts to be brazed may be oriented with the flow tube axis vertical in the braze furnace. The assembly is heated during the brazing process, and the stainless steel balance bar expands away from the titanium connecting rings. The top connecting ring drops under the force of gravity or other forces and moves downwards towards the axial center of the flow tube. The axial movement of the ring with respect to the balance bar results in the tapered connecting ring nesting deeper into the internal taper of the balance bar. This movement keeps the braze gap between the outer surface of the connecting ring and the inner surface of the balance bar negligible and thus keeps the capillary force sufficiently strong to keep the liquid braze material in the braze joint. The axial movement also keeps the connecting ring concentric with the balance bar.

The bottom connecting ring of the vertical assembly also has an external taper that is made to move into the bottom balance bar taper in a similar manner. The braze assembly can be supported in the furnace by the bottom connecting ring. This causes the weight of the balance bar and top connecting ring to push the bottom connecting ring further into the bottom balance bar taper as the balance bar expands.

In a first possible exemplary embodiment, the design of the taper defines the amount that the tapered connecting rings can axially enter into the balance bar as the assembly is heated. A smaller taper angle results in the connecting rings moving further in the axial direction in order to minimize the gap. The amount of insertion is critical because it determines the active length of the flow tube and thus the frequency, balance, and sensitivity of the meter. This embodiment requires precise machining of the matching tapers. The taper angles are kept small because the connecting ring has a small radial thickness compared to its length. The small taper angle means that small changes in taper diameter (machining tolerances) result in large changes in the axial location of the connecting ring.

In accordance with a second possible exemplary embodiment, the balance bar and the connecting rings have tapered braze surfaces as in the first embodiment. In the second embodiment, each inner braze surface of the balance bar has a machined step at its axial inner end. These steps limit the axial travel of the connecting rings into the balance bar at brazing temperatures and provide for a precise length of the active portion of the flow tube. As in the first embodiment, the balance bar expands with heating more than the connecting rings. The connecting rings then move into the balance bar internal tapers. The rings are designed to abut against the balance bar steps before the assembly reaches the maximum brazing temperature. With continued heating to brazing temperature, the gap between the tapers opens to an optimal amount for brazing such as 0.002". The steps ensure that the active tube length is maintained with precision because it is independent of machining tolerances of the tapers. This embodiment also allows for a predetermined braze gap.

Cooling of the brazed assembly, for both embodiments, results in the balance bar attempting to contract more than the titanium flow tube and the titanium connecting ring. The balance bar's greater radial contraction is opposed by the connecting rings which have moved into and been brazed to the tapers of the balance bar. This contraction results in the braze joints between the balance bar and the connecting rings being put in compression. The compression of the connecting ring by the balance bar also puts the braze joints between the connecting rings and the flow tube in compression. The compression results in stronger braze joints between the balance bar, the connecting rings, and the flow tube.

In accordance with yet another alternative embodiment of the invention, a configuration is provided that can compensate for the thermal expansion difference between the connecting ring and the balance bar and also the thermal expansion difference between the connecting ring and the flow tube. This configuration is used when the connecting rings are made of a third material that has an expansion coefficient that is between that of the flow tube and that of the balance bar. The use of a connecting ring of a material with a coefficient of expansion between those of the flow tube and the balance bar has the advantages of equalizing the thermal stress on the various elements and reducing the peak thermal stress accordingly when the brazed elements are cooled.

This third embodiment utilizes an additional titanium ring, called a tube ring, that encircles and is brazed to the titanium flow tube. This tube ring has a tapered outer diameter that matches a tapered inner diameter of the connecting ring. The connecting ring also has a tapered outer diameter that corresponds to a tapered inner diameter of the balance bar as in the prior embodiments.

The tapers on the inside and outside of the connecting ring are related by the differences in the thermal coefficient of expansion. The relationship between the tapers is necessary because the connecting rings can only move axially a single distance for both the internal and external tapers. If the difference in the expansion coefficients between the connecting ring and the tube is equal to the difference in expansion coefficients between the connecting ring and the balance bar, then the inner and outer taper angles can be equal. If the difference in the expansion coefficient between the balance bar and the connecting ring is larger than the coefficient difference between the connecting ring and the flow tube, the outer taper angle of the connecting ring will be larger than the inner taper angle of the connecting ring. The inner and outer taper angles of the connecting ring are designed so that at brazing temperature both the braze gaps are an optimal size. This embodiment can also have steps at the inner ends of the balance bar taper to better control the active tube length and the braze gaps.

In accordance with the present invention, the assembly comprising a flow tube, connecting rings surrounding the flow tube, and a surrounding balance bar is vertically oriented and brazed in accordance with the present invention by inserting one end of the vertically oriented flow tube together with the tapered connecting rings and balance bar into a support base. This base supports the assembly by the lower connecting ring. A weight having a center opening adapted to receive the upper end of the flow tube is placed on the upper connecting ring. The entire structure including the base support, the flowmeter assembly, and the top weight are placed in a brazing oven with braze material applied to the joints that are to be brazed. The entire assembly is heated to brazing temperature at which the stainless steel balance bar expands far more than does the connecting ring and flow tube. This expansion permits the weight on the top end of the assembly to press the tapered connecting rings into the balance bar by the required amount. The braze material flows into the surfaces to be joined. When cooled, the surfaces comprising the junction of the inner surface of the balance bar and the outer surface of the connecting ring as well as the surfaces comprising the junction of the inner surface of the connecting ring and the outer surface of the flow tube (and/or the tube ring) are now bonded. Also, the brazed surfaces are held together by the compressive forces generated by the stainless steel balance bar whose higher thermal coefficient of expansion attempts to compress radially the titanium connecting ring and flow tube. The connecting ring and flow tube generate forces that oppose the compressive force generated by the stainless steel.

It can therefore be seen that the method and apparatus of the present invention achieves an advance in the art by providing a simple and inexpensive brazing of a flow tube, connecting ring, and a balance bar made of dissimilar material.

An aspect of the invention comprises a Coriolis flowmeter having:

a flow tube;

connecting ring means having a center opening through which said flow tube extends;

a tubular balance bar coaxial with said flow tube and surrounding an axial portion of said flow tube;

said balance bar has a greater thermal coefficient of expansion than does said flow tube;

axial end portions of said balance bar coaxial with and surrounding at least a portion of said connecting ring means;

a radial inner circumferential surface of said connecting ring means coupled to an outer circumferential surface of said flow tube;

a radial outer circumferential surface of said connecting ring means is tapered with a decreasing radius in a first direction with respect to the axial center of said flow tube;

a radial inner circumferential surface of said end portions of said balance bar has a taper that matches said taper of said connecting ring means;

said connecting ring means is adapted to be partially inserted into ends of said balance bar prior to a brazing operation and then fully inserted into said balance bar, during said brazing operation as said balance bar expands in diameter more than said connecting ring;

said tapered inner circumferential surface of said end portions of balance bar is adapted to be affixed by braze material to said tapered outer circumferential surface of said connecting ring means at the termination of said brazing operation.

Another aspect is that said connecting ring means comprises:

a first connecting ring and a second connecting ring each adapted to be brazed to a different end of said balance bar;

a tapered radial outer circumferential surface of said first connecting ring is adapted to be brazed to said tapered radial inner circumferential surface of a first end of said balance bar during said brazing;

a tapered radial outer circumferential surface of said second connecting ring is adapted to be brazed to said tapered inner circumferential surface of a second end of said balance bar during said brazing operation.

Another aspect is that said first direction defines a taper that has a decreasing radius towards the axial center of said flow tube.

Another aspect is that said first direction defines a taper that has an increasing radius towards the axial center of said flow tube.

Another aspect is that said balance bar comprises a first and a second balance bar segments having axial inner end portions coupled to each other by spring means to accommodate a differential axial coefficient of expansion between said flow tube and said balance bar.

Another aspect is that said balance bar comprises an integral elongated member.

Another aspect is that said radial outer circumferential surface of said flow tube is affixed by braze material to said radial inner circumferential surfaces of said first and second connecting rings.

Another aspect is that said balance bar has a thermal coefficient of expansion greater than that of said first and second connecting rings and that said first and second connecting rings have a coefficient of expansion equal to that of said flow tube.

Another aspect includes a step on said radial inner end of said tapered circumferential surface of said balance bar that engages an axial inner end of said first and second connecting rings to limit the amount by which said first and second connecting rings can be axially inserted into said balance bar.

Another aspect comprises first and second annular tube rings coaxial with and encircling axial portions of said flow tube;

said axial portions of said radial outer circumferential surface of said flow tube are affixed by braze material to radial inner circumferential surfaces of said first and second annular tube rings;

a radial outer circumferential surface of each of said first and second annular tube rings is tapered with an increasing radius towards said axial center of said flow tube;

said radial inner circumferential surface of said first and second connecting rings has a taper that matches the taper of said first and second annular tube rings and has a diameter that decreases radially towards the axial center of said balance bar, said radial inner circumferential surface of said first and second connecting rings is adapted to be affixed by braze material to said radial outer circumferential surface of said first and second annular tube rings during said brazing operation.

Another aspect includes a step on said radial inner circumferential surface of said balance bar that engages the axial inner end of said first and second connecting rings to limit the amount by which said first and second connecting rings can be axially inserted into said balance bar during said brazing operation.

Another aspect is that said balance bar has a thermal coefficient of expansion greater than that of said first and second connecting rings and that said first and second connecting rings have a thermal coefficient of expansion greater than that of said first and second annular tube rings and that of said flow tube.

Another aspect is that said first and second connecting rings and said first and second annular tube rings and said balance bar have different thermal coefficients of expansion.

Another aspect comprises a method of assembling a Coriolis flowmeter having a flow tube, a connecting ring means, and a tubular balance bar, said method comprising the steps of:

extending said flow tube through a center opening in said tubular balance bar;
  positioning said flow tube so that said flow tube extends through a center opening of said connecting ring means and is coaxial with said balance bar;
  positioning said connecting ring means so that axial end portions of said balance bar are coaxial with and surround at least a portion of said connecting ring means;
  coupling a radial inner circumferential surface of said connecting ring means to said flow tube;
  a radial outer circumferential surface of said connecting ring means is tapered in a first direction with a decreasing radius with respect to the axial center of said flow tube;
  radial inner circumferential surfaces of said axial end portions of said balance bar have a taper that matches said taper of said connecting ring means;
  said balance bar has a greater thermal coefficient of expansion than does said flow tube; and
  brazing said tapered inner circumferential surface of said end portions of balance bar to said tapered outer circumferential surface of said connecting ring means, said connecting ring means being axially moved within said balance bar during said brazing beyond the axial location within said balance bar prior to brazing.

Another aspect is that said connecting ring means comprises a first connecting ring and a second connecting ring; said step of brazing comprises the step of moving each said connecting ring in an axial direction during said brazing operation so that the radial pressure exerted on said flow tube by each said connecting ring increased subsequent to brazing.

Another aspect is that said first direction defines a taper of said connecting ring having a decreasing radius towards the axial center of said flow tube.

Another aspect is that said step of brazing comprises the steps of:

axially moving said first and second connecting rings towards said axial center of said balance bar during said step of brazing; and
  cooling said brazed surfaces so that said greater thermal coefficient of expansion of said balance bargenerates a radially compressive force against said first and second connecting rings and said flow tube.

Another aspect is that said step of bonding includes the step of brazing said outer circumferential surface of said flow tube to said inner circumferential surface of said first and second connecting rings; and axially moving said first and second connecting rings towards said axial center of said balance bar during said step of brazing.

Another aspect includes the step of forming a step on said inner tapered circumferential surface of said balance bar that engages axial inner ends of said first and second connecting rings to limit the amount by which said first and second connecting rings can be axially inserted into said balance bar during said brazing.

Another aspect is that:

first and second annular tube rings couple said flow tube with said first and second connecting rings; said method further includes the step of:
  bonding said outer radial circumferential surface of said flow tube to an inner radial circumferential surface of each of said first and second annular tube rings;
  an outer radial circumferential surface of said first and second annular tube rings is tapered to have an axially increasing radius towards said axial center of said flow tube;
  said inner radial circumferential surface of said first and second connecting rings have a taper that matches that of said first and second annular tube rings and has a radius that decreases towards the axial mid portion of said balance bar, and
  brazing said tapered inner circumferential surface of said first and second connecting rings to said tapered outer circumferential surface of said first and second annular tube rings.

Another aspect is that said step of axially moving said first and second connecting rings towards said axial center of said balance bar during said step of brazing.

Another aspect includes the step of forming a step on said inner circumferential tapered surface of said balance bar that engages the axial inner end of said first and second connecting rings to limit the amount by which said first and second connecting rings can be axially inserted into said balance bar during said step of brazing.

Another aspect is that said balance bar has a thermal coefficient of expansion greater than that of said first and second connecting rings and that said first and second connecting rings have a thermal coefficient of expansion greater than that of said first and second annular tube rings and that of said flow tube;

said method further includes the step of axially moving said first and second connecting rings towards said axial center of said balance bar during said step of brazing.

Another aspect includes the steps of:

orienting said flow tube and said balance bar so that a first end of said flow tube extends into a recess of a base;
  placing said first and second connecting rings concentric with said flow tube and axially at least partially within first and second ends of said balance bar so that the outer ends of said connecting rings extend axially beyond the ends of said balance bar;
  placing braze material proximate the axial end extremities of the junctions of surfaces common to said balance bar and said first and second connecting rings and junctions of surfaces common to said connecting rings and said flow tube;
  placing a mass on a second end of said flow tube so that said mass exerts a force on said connecting rings urging them axially into engagement with said balance bar; the outer ends of said connecting rings then extending axially beyond the ends of said balance bar;
  heating said balance bar and said connecting rings and said flow tube to brazing temperatures;

the brazing temperature being effective to expand said balance bar radially to enable said connecting rings to move axially inward within said balance bar; and cooling said brazed surfaces so that said greater thermal coefficient of expansion of said balance bar generates a radially compressive force against said first and second connecting rings and said flow tube.

Another aspect is that said balance bar comprises first and a second axially separated segments and that said method further comprises the steps of connecting spring means between the axial inner end of each of said balance bar segments to accommodate a differential thermal coefficient of expansion between said flow tube and said balance bar segments.

Another aspect is that said first direction defines a taper of said connecting rings having an increasing radius towards the axial center of said flow tube.

Another aspect further comprises the steps of:

axially moving said first and second end portions of said connecting rings towards said axial center of said balance bar during said step of brazing;

brazing said tapered inner circumferential surfaces of said first and second end portions of balance bar with said tapered outer radial circumferential surfaces of first and second said connecting rings; and cooling said brazed surfaces so that said greater thermal coefficient of expansion of said balance bar generates a radially compressive force against said first and second connecting rings and said flow tube.

Another aspect is that said balance bar comprises a pair of axially separated segments and that said method further includes the steps of:

extending a first end of said flow tube through a center opening of said first connecting ring;

extending a second end of said flow tube through a center opening of a second connecting ring;

affixing said first and second connecting rings to said flow tube;

extending said first end of said flow tube and said first connecting ring through a first balance bar segment;

extending said second end of said flow tube and said second connecting ring through a said second balance bar segment;

placing braze material proximate the axial extremities said first and second connecting rings proximate said flow tube and said balance bar segments;

exerting a force on said balance bar segments urging them towards an axial center of flow tube and said balance bar;

heating said balance bar segments and said connecting rings and said flow tube to brazing temperatures;

the brazing temperature being effective to expand said balance bar radially to enable said balance bar end segments to move axially inward toward said axial center of said flow tube and said balance bar; and, cooling said brazed surfaces so that said greater thermal coefficient of expansion of said balance bar segments generates a radially compressive force against said first and second connecting rings and said flow tube.

Another aspect is a method of assembling said Coriolis flowmeter, said method comprising the steps of:

extending said flow tube through a center opening in said tubular balance bar;

positioning said connecting ring means so that axial end portions of said balance bar are coaxial with and surround at least a portion of said connecting ring means;

positioning said flow tube so that said flow tube extends through a center opening of said connecting ring means and is coaxial with said balance bar;

positioning a radial inner circumferential surface of said connecting ring means against said flow tube;

said outer radial circumferential surface of said connecting ring means is tapered in a first direction with a decreasing radius with respect to the axial center of said flow tube;

said inner radial circumferential surfaces of said axial end portions of said balance bar have a taper that matches said taper of said connecting ring means; and brazing said tapered inner circumferential surface of said end portions of balance bar to said tapered outer circumferential surface of said connecting ring means; and moving said connecting ring in an axial direction during said brazing operation so that the radial pressure exerted on said flow tube by said connecting increases subsequent to brazing.

Description of the Drawings

The above advantages and features of the invention may be better understood when taken in conjunction with the following detailed description taken in conjunction with the drawings in which.

DETAILED DESCRIPTION

Figure 1:
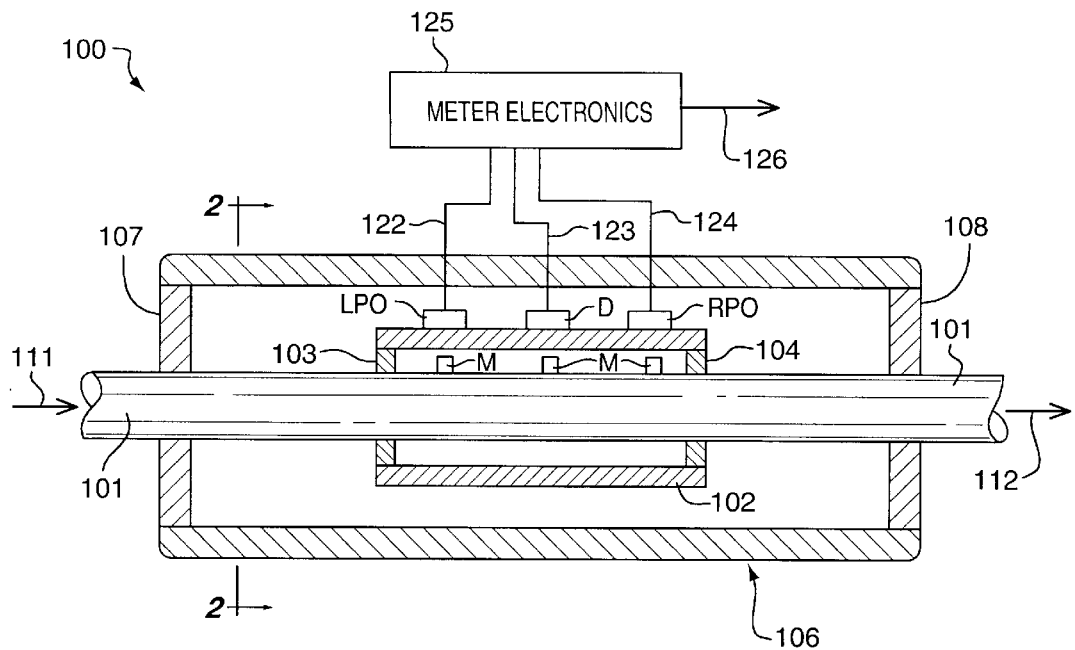
FIG. 1 is a cross sectioned view of a prior art single tube Coriolis flowmeter.
Figure 2:
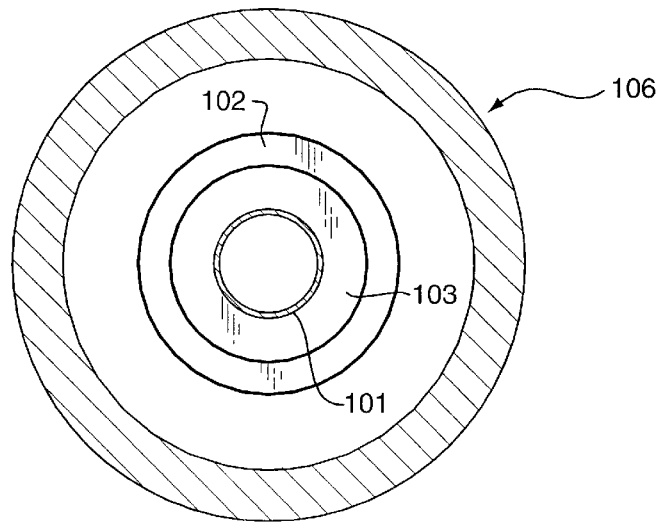
FIG. 2 is a end view of the Coriolis flowmeter of FIG. 1.

Description of FIGS. 1 and 2

FIG. 1 discloses a cross section of a prior art flowmeter 100 having a case 106 enclosing a balance bar 102 and flow tube 101. The ends of flow tube 101 project beyond the case ends 107 and 108 to flanges (not shown) which enable flowmeter 100 to be connected to a conduit whose material flow is to be measured. Meter electronics 125 is connected by conductors 122,123, and 124 to flowmeter 100 to control its operation and to receive output signals from pick offs (velocity sensors) LPO and RPO. Meter electronics processes the received information and transmits output information representing the material flow over conductor 126 to a utilization circuit not shown. Meter electronics applies signals over path 123 to driver D which in a well known manner vibrates flow tube 101 and balance bar 102 in phase opposition. The vibrations of flow tube 101 with material flow induces a Coriolis response in flow tube 101. The amplitude of Coriolis response is indicative of the material flow and is detected by pick offs LPO and RPO. Pick offs LPO and RPO transmit output signals over paths 122 and 124 to meter electronics 125 which determines the phase difference between the output signals of the two pick offs. This phase difference is proportional to the flow rate.

FIG. 2 is a cross sectioned end view of a prior art flowmeter 100 taken along lines 2—2 of FIG. 1. Case 106 surrounds tubular balance bar 102 which in turn surrounds flow tube 101. Connecting ring 103 is an annular element having a center through which flow tube 101 projects. The outer circumference of connecting ring 103 is coupled to the inner portion of balance bar 102. Connecting ring 104 is similar to connecting ring 103.

Figure 3:
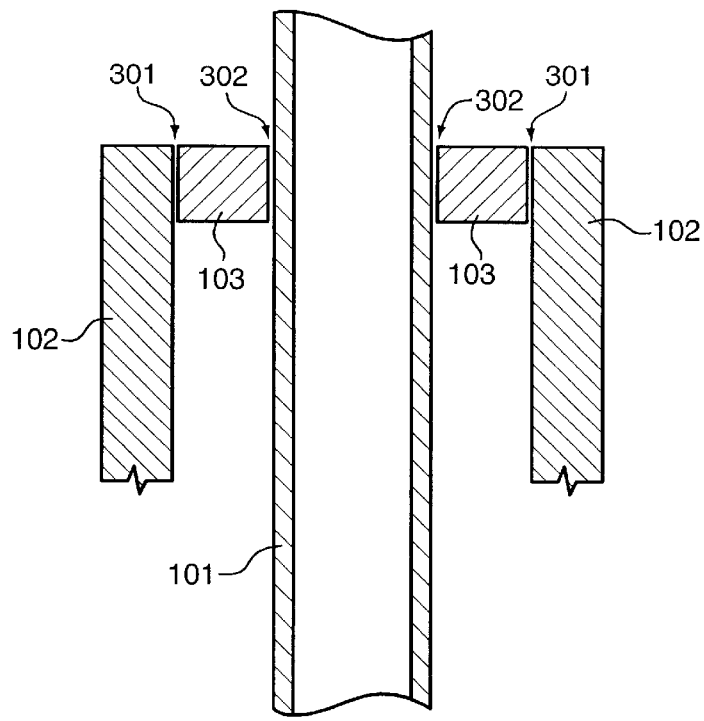
FIGS. 3 and 4 are partial cross sectioned views of the flow tube, connecting ring, and balance bar of the prior art Coriolis flowmeter of FIGS. 1 and 2.
Figure 4:
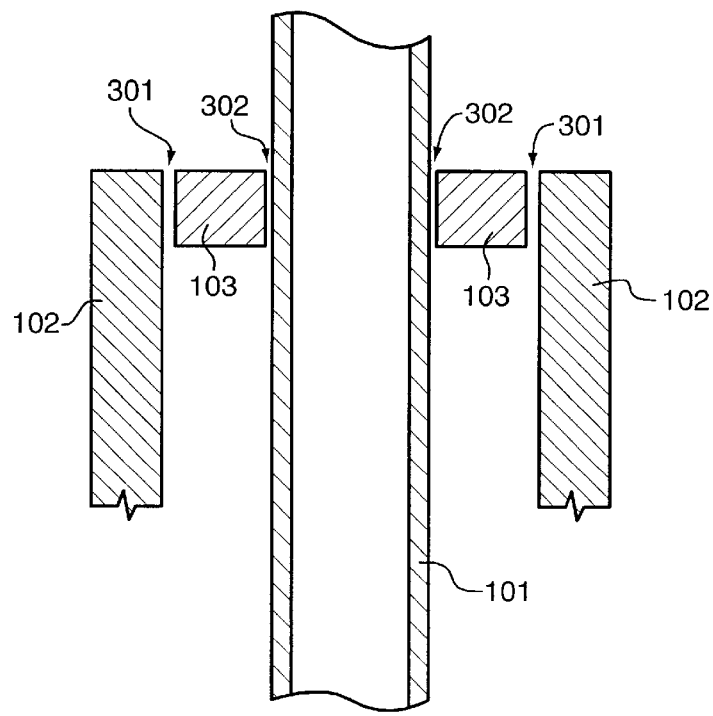

Description of FIGS. 3 and 4

FIGS. 3 and 4 disclose further details of relevance to a brazing operation between balance bar 102, connecting ring 103, and flow tube 101. FIG. 3 shows gap 301 between connecting ring 103 and balance bar 102 as well as gap 302 between the connecting ring 103 and flow tube 101. These gaps are approximately 0.005 cm and exist for several reasons. The tolerances of the machinery used to fabricate these elements requires a gap to facilitate assembly. The gaps are also used in the brazing process to wick the liquid braze material into the joints. These gaps are exaggerated for clarity. They are in reality barely discernable to the human eye.

The gaps shown on FIG. 3 apply to a Coriolis flowmeter having similar materials for the balance bar 102, connecting ring 103, and flow tube 101. When such a meter is heated to brazing temperature, the gaps remain substantially the same size because the elements all have the same thermal coefficient of expansion and expand at the same rate. The gaps 301 and 302 remain at a 0.005 cm for all normal temperature to which the flowmeter may be subjected including brazing.

This gap is consistent with that required for the brazing process. Therefore, the flowmeter of FIG. 3 made of similar materials can readily be brazed.

FIG. 4 is similar to FIG. 3 except that it shows the gaps that exist at brazing temperature for a Coriolis flowmeter having a balance bar with a higher coefficient of expansion than the other elements. The meter of FIG. 4, like that of FIG. 3, has gaps of 0.005 cm at room temperature. In the flowmeter of FIG. 4, the flow tube 101 and connecting ring 103 are assumed to be made of titanium which has a low thermal coefficient of expansion. Balance bar 102 is made of a material such as stainless steel having a far higher thermal coefficient of expansion. In FIG. 4, gap 302 remains at its nominal width of 0.005 cm since the flow tube 101 and connecting ring 103 are assumed to be both made of titanium and expand radially by an equal amount. However, the stainless steel balance bar 102 expands radially far more than do the titanium flow tube 101 and connecting ring 103. This causes gap 301 to increase due to the larger thermal expansion of balance bar 102. Gap 301 may become as large at 0.023 cm during brazing as is shown in FIG. 4. A gap of 0.023 cm is not suitable for a brazing operations since the capillary attraction is not sufficiently strong with the large gap to draw the braze material into the gap 301 and hold it there. Instead, the braze material flows unevenly and may run down the flow tube or balance bar. This leaves portions of the surfaces unbrazed and results in a defective braze joint.

Figure 5:
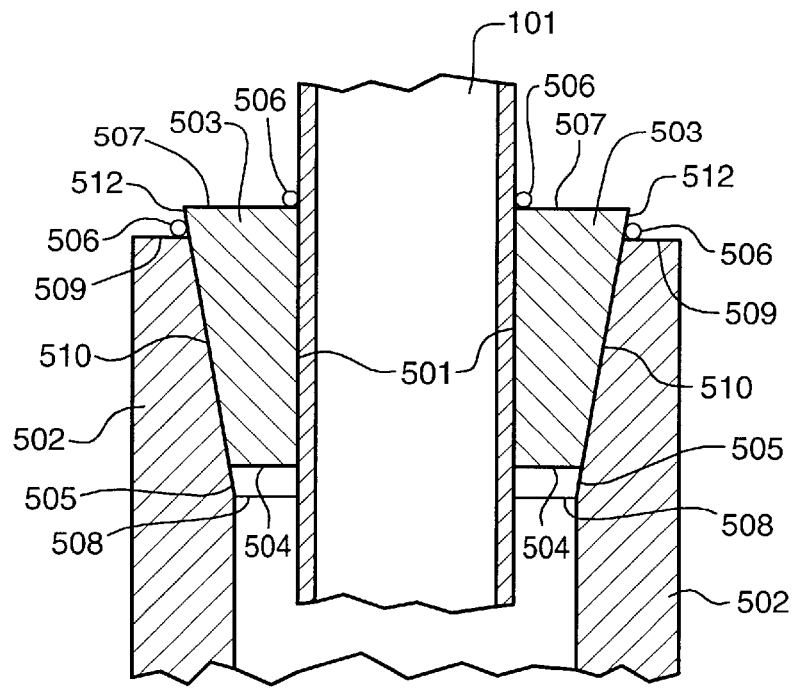
FIGS. 5, 6, and 7 illustrate partial cross sectioned views of a balance bar, a connecting ring, and a flow tube in accordance with a first possible exemplary embodiment of the invention.
Figure 6:
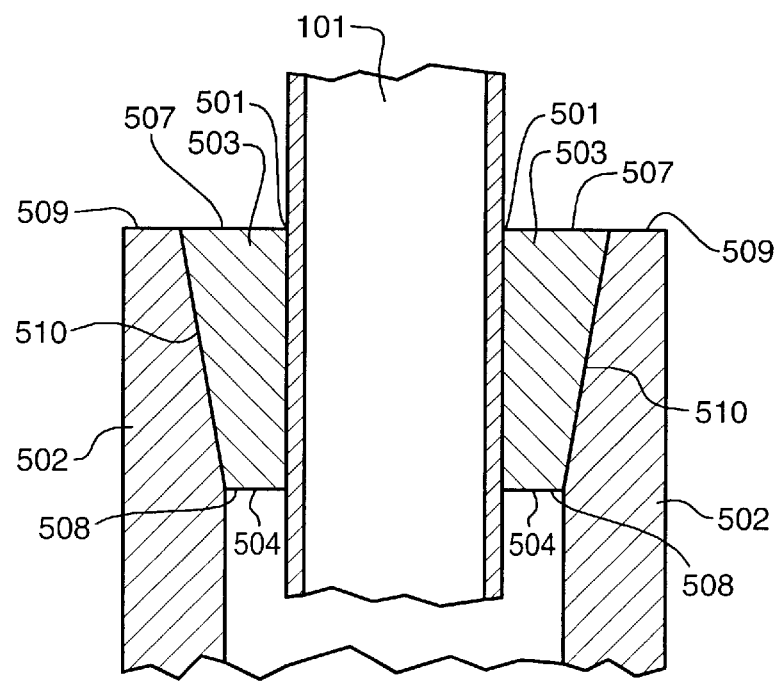
Figure 7:
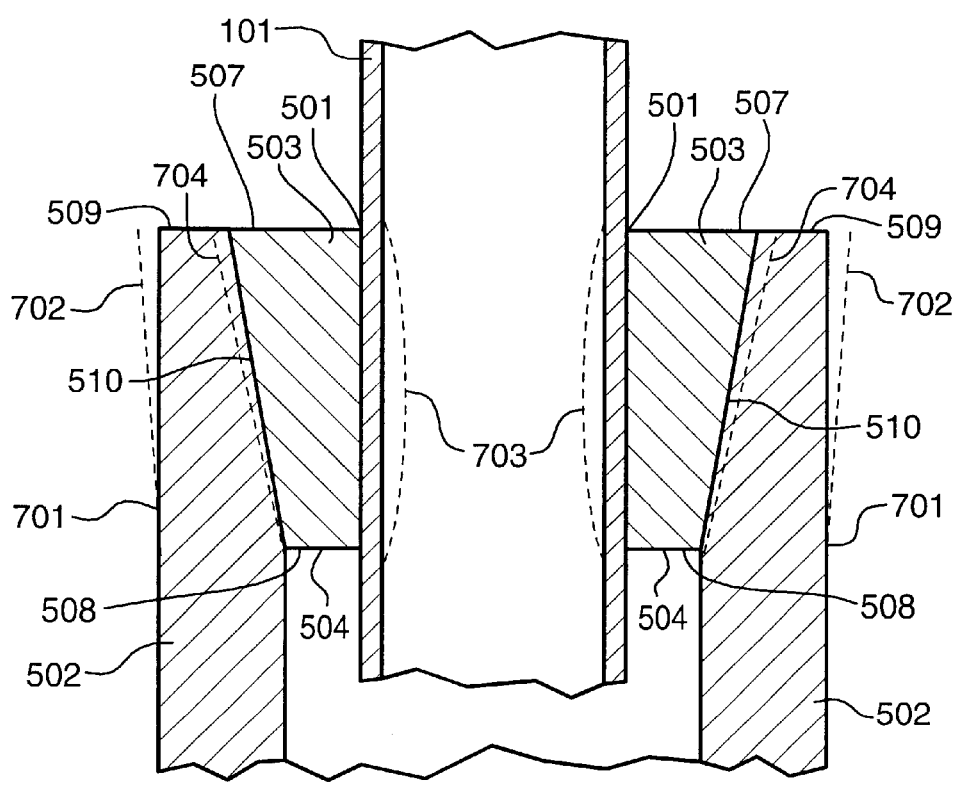

Description of FIGS. 5, 6 and 7

FIG. 5 represents the room temperature state these elements. Connecting ring 503 is inserted downwardly as shown between flow tube 101 and balance bar 502. The tapered surface 512 of connecting ring 503 permits the connecting ring to be inserted downwardly until its lower surface 504 is at a position in which the surface 512 of connecting ring 503 snugly engages the tapered inner surface 505 of balance bar 502. Prior to heating end surface 507 of connecting ring 503 is above the end surface 509 of balance bar 502. Also, the lower end surface 504 of connecting ring 503 is spaced apart from location 508 which represents the position to which surface 504 of connecting ring 503 must be moved at brazing temperature so that the connecting ring outer braze surface 512 is fully engaged with the balance bar inner braze surface 505. Reference 510 represents the junction of the outer surface 512 of connecting ring 503 and the tapered inner surface 505 of the end of balance bar 502. The actual spacing between the flow tube 101 and the connecting ring 503 is approximately 0.005 cm as shown in exaggerated form by gap 301 on FIGS. 3 and 4. The gap between the connecting ring 503 and the balance bar 502 is negligible because balance bar 502 is supporting the connecting ring 503 along this surface. The braze material is easily pulled into the negligible gap because the capillary force goes up as the gap decreases. With respect to FIGS. 5 and 6, the 0.005 cm spacing between the connecting ring inner surface and the flow tube outer surface is not perceptible to the human eye. However, it does permit braze material 506 to melt and flow during the brazing process to bond the inner surface of connecting ring 503 to outer surface 501 of flow tube 101.

FIG. 6 represents the state of the elements of FIG. 5 when they are subjected to a brazing operation in which the temperature is elevated to approximately 800° C. As the temperature rises, stainless steel balance bar 502 expands radially far more than do titanium connecting ring 503 and flow tube 101. This expansion attempts to pull balance bar 502 radially away from connecting ring 503 and flow tube 101. However, as balance bar 502 radially expands, the tapered connecting ring 503 moves downward in FIG. 6 to maintain contact. This downward movement of connecting ring 503 continues until it assumes the position shown on FIG. 6 as the assembly reaches the required brazing temperature. At brazing temperature the gap at 501 has maintained 0.005 cm radial clearance and the gap at 502 is still negligible because the balance bar is still supporting the connecting ring. The braze material 506 melts at brazing temperature and is drawn into the gaps at junctions 501 and 510. The braze material wicks into the negligible gap 510 because of the very strong capillary attraction. The flowmeter is then cooled and removed from the brazing oven. Connecting ring 503 is now bonded by braze material to flow tube 101 and balance bar 502.

FIG. 7 is similar to FIG. 6 except that it represents an exaggerated state of the flowmeter elements subsequent to the brazing and cooling process. The cooling of these elements after brazing causes balance bar 502 to impose a large radial force on connecting ring 503 and flow tube 101 as the stainless steel balance bar attempts to contract more than the titanium flow tube and connecting ring. This force slightly deforms the flow tube 101 inwardly along dashed lines 703 and deflects the end tapered portions of balance bar 502 outwardly as indicated by dashed lines 702 and 704 in FIG. 7. These deformations are exaggerated in FIG.7. In reality they are slight and do not adversely effect the accuracy of operation or the reliability of the flowmeter.
Description of FIGS. 8 and 9

Figure 8:
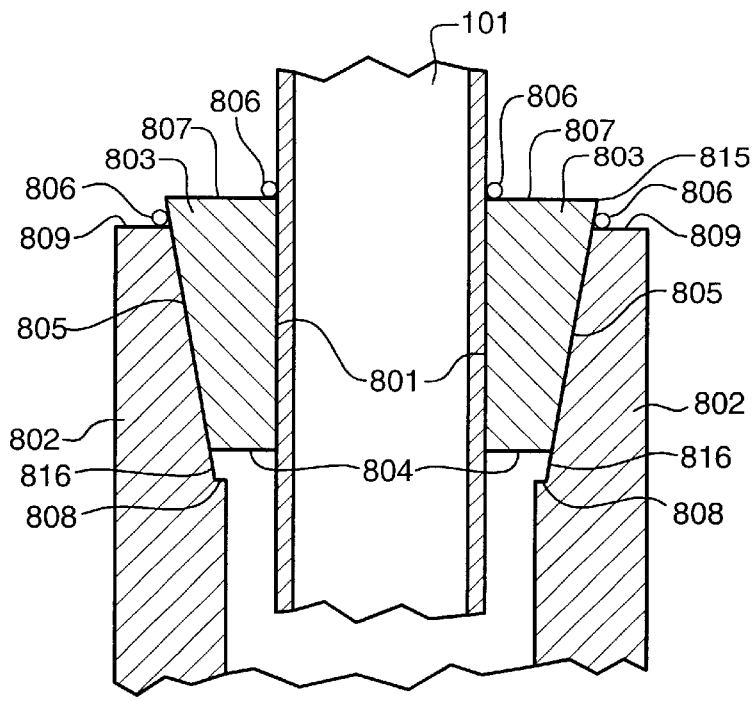
FIGS. 8 and 9 illustrate a partial cross sectioned view of a flow tube, a connecting ring, and a balance bar in accordance with a second possible exemplary embodiment of the invention.
Figure 9:
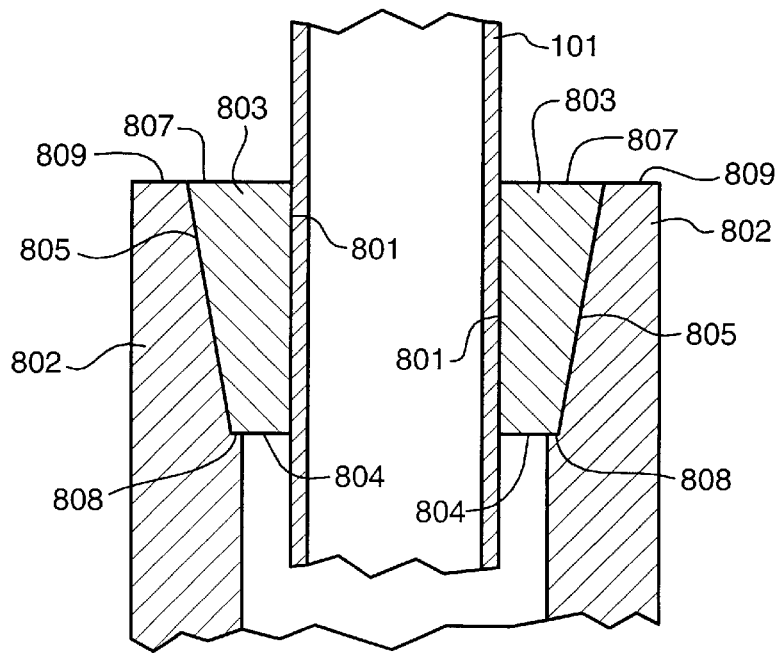

FIGS. 8 and 9 show a partial sectional view of a balance bar 802, a flow tube 101 and a connecting ring 803 intermediate the balance bar and flow tube. The structure of FIG. 8 is similar to that of FIGS. 5–7 except for the addition of step element 808 to the inner surface of balance bar 802.

FIG. 8 represents the room temperature state of these elements before brazing. FIG. 9 represents the state of these elements during the high temperature brazing operation and subsequent cooling. Flow tube 101 and connecting ring 803 are of titanium and have the same thermal coefficient of expansion. Balance bar 802 is of a material having a higher thermal coefficient of expansion such as stainless steel. Connecting ring 803 and balance bar 802 have matching tapers along their junction at 805. Element 801 is the junction between the connecting ring and the flow tube.

FIG. 8 represents the room temperature state of these elements prior to brazing. Tapered connecting ring 803 extends downwardly on FIG. 8 only to the position shown in which the top surface 807 of the connecting ring is above end surface 809 of the balance bar. Also, the bottom surface 804 of the connecting ring is above a step 808 machined into the inner surface of balance bar 802. Step 808 defines the limit to which connecting ring 803 can move downwardly from its position as shown on FIG. 8. Junction 801 defines a gap having a radial width of approximately 0.005 cm. The gap at junction 805 between the connecting ring 803 and the balance bar 802 is negligible because the balance bar 802 supports the connecting ring 803. Element 815 is the tapered outer circumferential surface of connecting ring 803. Element 816 is the tapered inner circumferential surface of an end portion of balance bar 802.

FIG. 9 shows the state of these elements during the high temperature brazing operation. The heating of these elements causes the stainless steel balance bar 802 to expand outwardly more than does the titanium connecting ring 803 and the titanium flow tube 101. This expansion of the stainless steel balance bar 802 permits tapered connecting ring 803 to move downward until its bottom surface 804 engages step 808. After the connecting ring's downward motion has been halted by step 808, the balance bar continues to expand with temperature until at the peak brazing temperature a gap of optimum width such as 0.005 cm is created. The braze material 806 is melted and is drawn downwardly to fill the entirety of junctions 802 and 801. This structure is cooled to room temperature following the brazing operation. The Coriolis flowmeter elements of FIG. 9 are subject to the same stresses shown for the flowmeter elements of FIG. 7 and have the same minor depressions 703 of the interior of the flow tube and have the same stress deflections 702 and 704 shown on FIG. 7. These stresses are not shown on a separate figure for the embodiment of FIGS. 8 and 9 since they are comparable in every respect to those shown on FIG. 7. A partially assembled Coriolis flowmeter embodying the elements of FIGS. 8 and 9 is shown on FIG. 17 except for the lack of a step element 808 on the inner surface of the balance bar of FIG. 17. If desired, the balance bar of FIG. 17 could be adapted to include a step element 808 on it's inner surface.
Description of FIGS. 10 and 11

The tapered connecting ring 1003 can be made of material having an expansion coefficient that falls between the low expansion coefficient of the titanium flow tube 101 and the high expansion coefficient of the stainless steel balance bar 1502. Such material could be a mild steel, hastelloy, or an austenitic stainless steel such as a grade 430 stainless steel. Using a connecting ring having an intermediate expansion coefficient is advantageous because the difference in thermal expansion coefficients across each braze joint is lower. This results in lower residual stress in the assembly after brazing.

FIGS. 5 and 6 show Coriolis flowmeter structure embodying a first possible exemplary embodiment of the invention. This structure enables a tapered titanium connecting ring 503 to be brazed to a titanium flow tube 101 and to a balance bar 502 formed of material, such as stainless steel having a far higher thermal coefficient of expansion. Flow tube 101 and connecting ring 503 are advantageously formed of titanium or other material having a low thermal coefficient of expansion. Flow tube 101 is comparable to flow tubes 101 shown on FIGS. 3 and 4. Balance bar 502 is preferably formed of stainless steel or other material having a relatively high thermal coefficient of expansion. Surface 505 of balance bar 502 is tapered and comprises one member of the junction 510 between the inner surface of balance bar 502 and the outer surface of connecting ring 503. With this exception, balance bar 102 is otherwise similar to balance bar 502 of FIGS. 3 and 4. Titanium connecting ring 503 has an outer circumferential surface 512 that is inwardly tapered to mate with the taper on the inner surface 505 of the upper portion of balance bar 502. Balance bar 502 may be a single integral structure as shown for the Coriolis flowmeter of FIG. 17 or may alternatively be part of a balance bar having a plurality of segments separated by spring structure comparable to element 1240 of the Coriolis flowmeter shown of FIGS. 12 and 13.

Figure 10:
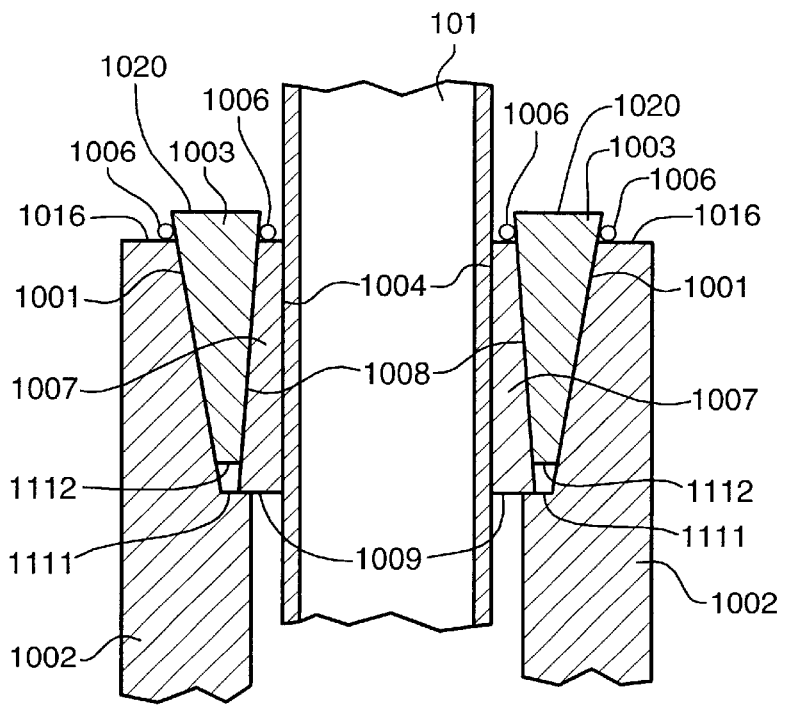
FIGS. 10 and 11 illustrate a partial cross sectioned view of a flow tube, a tube ring, a connecting ring, and a balance bar in accordance with yet another possible exemplary embodiment of the invention.
Figure 11:
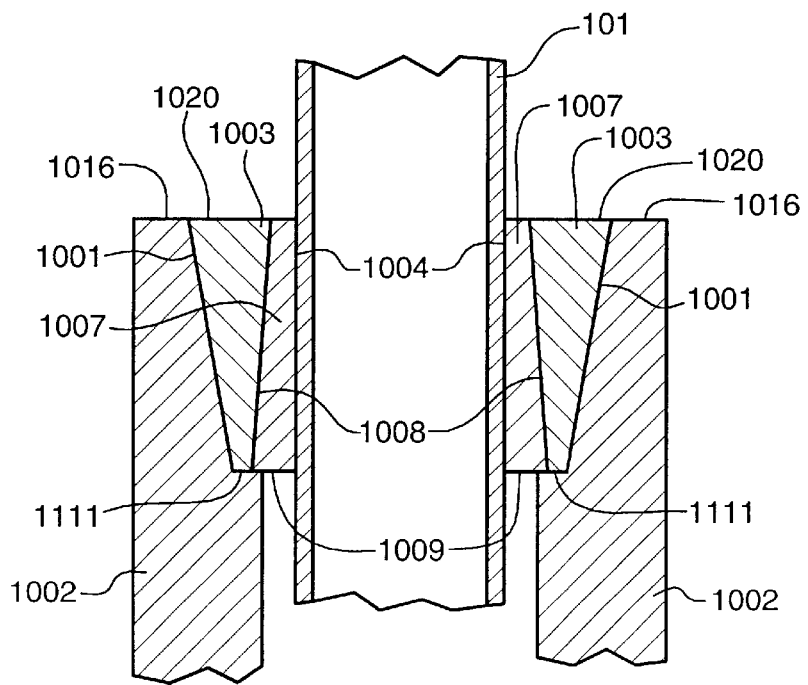

FIGS. 10 and 11 show an exemplary embodiment of the invention having the connecting rings of a material having an intermediate thermal expansion coefficient. This third embodiment comprises a flow tube 101, an additional element called a tube ring 1007 surrounding the flow tube, tapered connecting ring 1003 and balance bar 1002. Flow tube 101 and tube ring 1007 are both formed of titanium and have the same thermal coefficient of expansion. Connecting ring 1003 is formed of 430 alloy stainless steel and has a coefficient of expansion higher than that of the titanium flow tube 101 and tube ring 1007, but lower than that of balance bar 1002 which is made of 304 alloy stainless steel. This third embodiment compensates for the difference in expansion rate between the balance bar 1002 and the connecting ring 1003 in the same manner as the second embodiment of FIGS. 7 and 8. This third embodiment differs from the prior embodiments, however, in that the connecting ring material expands at a greater rate than does the titanium flow tube 101.

The differential expansion between the connecting ring 1003 and flow tube 101 is dealt with in the same way as the differential expansion between connecting ring 1003 and balance bar 1002. The inner surface 1008 of connecting ring 1003 has a taper. Since the outer surface of the flow tube 101 cannot have a taper without an excessive thinning if the tube wall, an additional part, the tube ring 1007 is required. The tube ring is made of titanium and expands at the same rate as the flow tube. The gap between the tube ring and the flow tube can therefore be set at 0.005 cm. Titanium tube ring 1007 has a tapered outer diameter that corresponds to the inner tapered diameter of the connecting ring 1003. Connecting ring 1003 also has a tapered outer diameter that corresponds to the tapered inner diameter of balance bar 1002. The tapers on the inside and outside of connecting ring 1003 are related by the differences in expansion coefficient. If the difference in expansion coefficient between the balance bar and the connecting ring is larger than the difference between the connecting ring and the flow tube, the outer taper will have a greater angle than the inner taper. The inner and outer taper angles are related by the fact that both gaps are determined by the same axial translation of the connecting ring. The provision of the titanium tube ring 1007 and the 430 stainless connecting ring 1003 is advantageous in that it provides another element to share the stress caused by the differences in thermal expansion between the titanium flow tube 101 and the 304 stainless steel balance bar 1002. to the inner tapered diameter of the connecting ring 1003. Connecting ring 1003 also has a tapered outer diameter that corresponds to the tapered inner diameter of balance bar 1002. The tapers on the inside and outside of connecting ring 1003 are related by the differences in expansion coefficient. If the difference in expansion coefficient between the balance bar and the connecting ring is larger than the difference between the connecting ring and the flow tube, the outer taper will have a greater angle than the inner taper. The inner and outer taper angles are related by the fact that both gaps are determined by the same axial translation of the connecting ring. The provision of the titanium tube ring 1007 and the 430 stainless connecting ring is advantageous in that it provides another element to share the stress caused by the differences in thermal expansion between the titanium flow tube 101 and the 304 stainless steel balance bar 1002.

FIG. 10 represents the cold state of these elements in which the top surface 1020 of connecting ring 1003 is above end surface 1016 of balance bar 1002. Similarly, the bottom end surface 1112 of connecting ring 1003 is spaced apart from step 1111. The bottom surface 1009 of tube ring 1007 rests on step 1111. Braze material elements 1006 are positioned proximate junctions 1001, 1008, and 1004 in preparation for a brazing operation in which the braze material is melted.

FIG. 11 represents the state of these elements at brazing temperature and the subsequent state in which the braze elements are returned to room temperature. As can be seen on FIG. 11, the balance bar expands radially outward during the brazing operation to provide room on the outside of the connection ring for connecting ring 1003 to descend. Simultaneously, the connecting ring 1003 expands outward (although a lesser amount) providing room on the inside for the connecting ring 1003 to descend until its bottom surface 1112 engages step 1111. At this time the top surface 1020 of connecting ring 1003 is flush with the top surface 1016 of balance bar 1002. The step 1111 and the tapers can be designed so that at brazing temperature the brazing gaps are both optimal for the materials being brazed.

Figure 12:
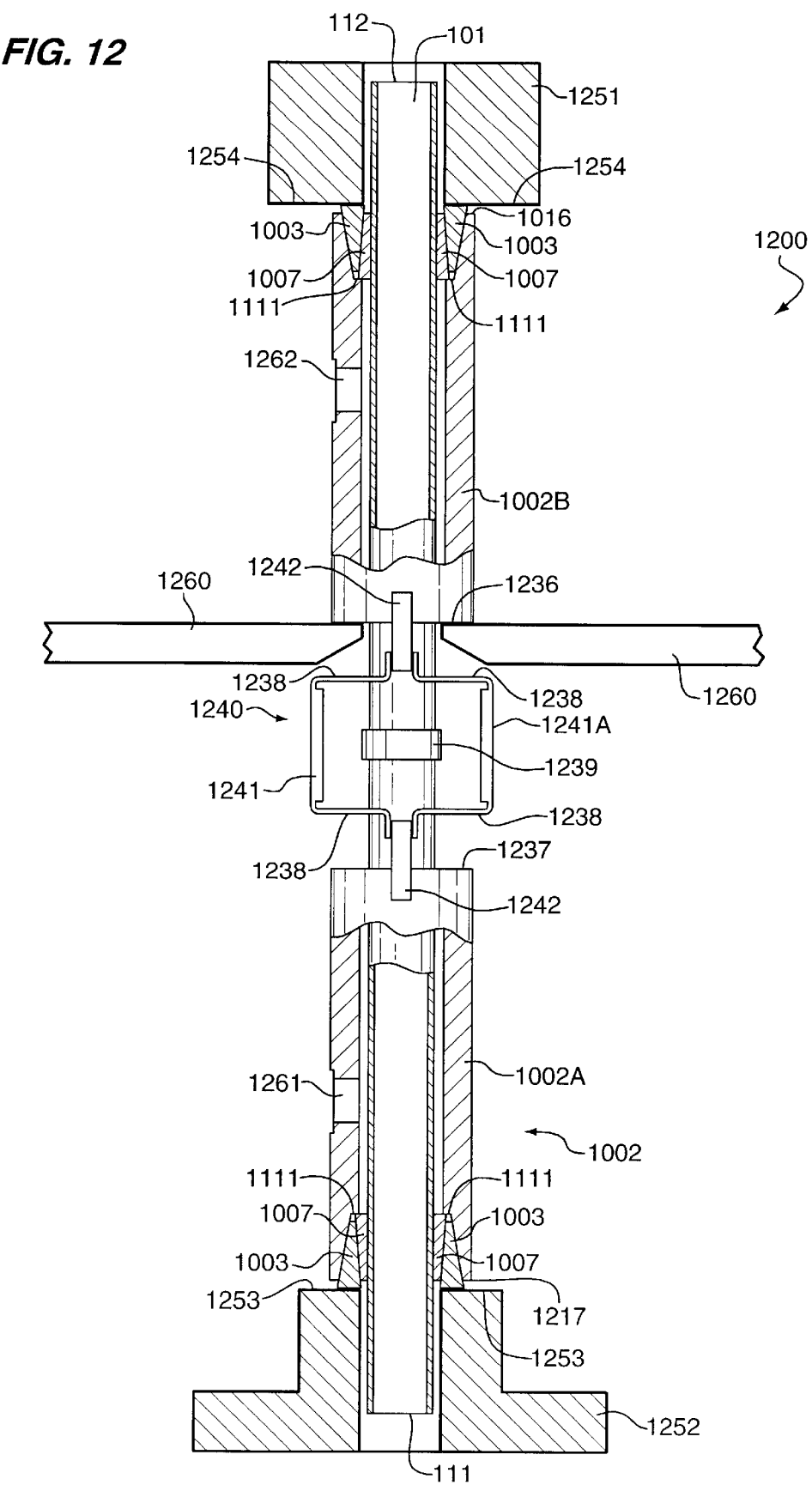
FIG. 12 discloses the details of how a partially assembled flowmeter is fixtured prior to insertion into a brazing oven.

Description of FIG. 12

FIG. 12 discloses room temperature state of flowmeter 1200 having elements comparable to that of FIGS. 10 and 11 prior to a brazing operation. Balance bar 1002 of FIGS. 10 and 11 corresponds to balance bar segments 1002A and 1002B of FIG. 12. FIG. 12 further shows a braze fixture comprising a base 1252 on which the flowmeter may be positioned as well as a weight 1251 which may be positioned on top of the flowmeter prior to brazing. Weight 1251 provides the force required to push the upper tapered connecting ring 1003 downward with respect to balance bar segment 1002B during the brazing operation. Flow tube 101, titanium tube rings 1007, connecting rings 1003, and the end portions of balance bar 1002 correspond to the similarly designated elements on FIGS. 10 and 11. A connecting ring 1003 and associated braze elements is shown on the top end of the balance bar segment 1002B. Another set of similarly designated elements is shown on the bottom of balance bar segment 1002A.

The lower end 111 of flow tube 101 extends into an opening in base 1252. The upper end 112 of flow tube 101 is inserted into a center opening in weight 1251. Weight 1251 provides the downward force required during the brazing operation to press the top connecting ring 1003 into the space provided by the radial expansion of balance bar 1002. The upper tapered connecting ring 1003 moves downwardly until its bottom surface engages step 1111. The downward force provided by weight 1251 as well as the weight of the flowmeter 1200 assembly pushes the lower connecting ring 1003 into the space provided by the radial expansion of balance bar segment 1002A so that the end of lower connecting ring 1003 firmly engages the step 1111 within balance bar segment 1002A. Balance bar segment 1002B is supported at end 1236 by part of the brazing fixture 1260.

The separate balance bar segments 1002B and 1002A are separated by spring structure 1240 intermediate the lower end 1236 of balance bar segment 1002B and the upper end 1237 of balance bar segment 1002A. This spring structure flexes axially and accommodates the axial expansion that occurs during brazing between balance bar segments 1002A and 1002B. Spring structure 1240 and its supporting elements include support bars 1242 which comprise extensions of the inner axial extremities 1236 and 1237 of balance bar segments 1002A and 1002B. This spring structure 1240 further includes spring elements 1238 each of which has an inner end affixed to support bar 1242 and an outer end affixed to structures 1241 and 1241A which support a driver D and associated coil as shown on FIG. 13 structure 1241A further support weight 1240A (FIG. 13) which is used to dynamically counter balance the mass of driver D of FIG. 13. Holes 1261 and 1262 receive pick offs RPO and LPO of FIG. 13.

Figure 13:
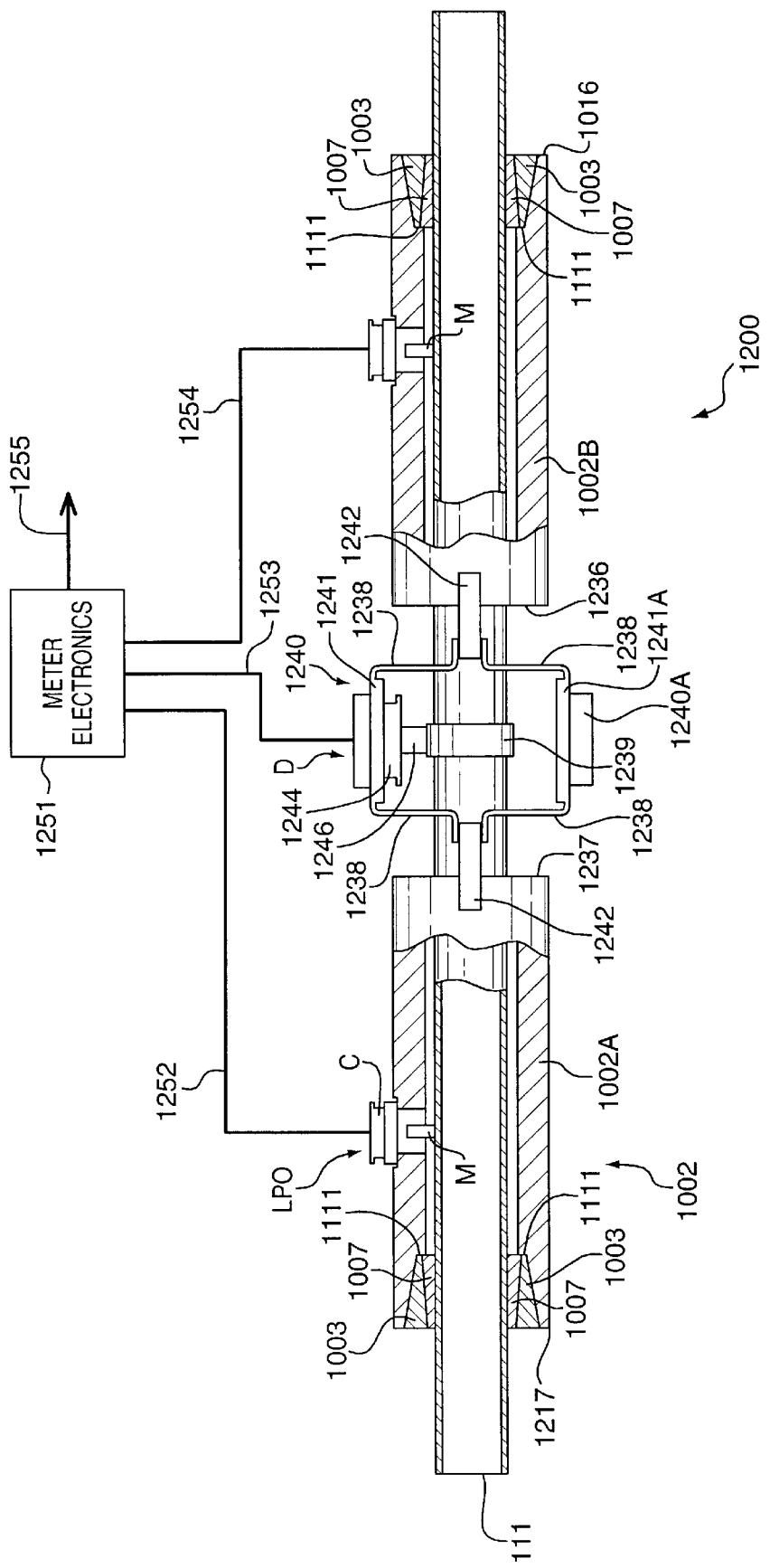
FIG. 13 discloses the details of the flowmeter of FIG.12 after partial assembly.

Description of FIG. 13

Shown on FIG. 13 are elements which are affixed to flowmeter 1200 of FIG. 12 subsequent to the brazing operation. These elements include driver D with its coil 1244 and magnet 1246, left pick off LPO and right pick off RPO with their coils C and magnets. Also coupled to flowmeter 1200 at this time is meter electronics 1251 which is connected by conductors 1252 and 1254 to pick offs LPO and RPO and by conductor 1253 to driver D which drives the flow tube and balance bar in-phase opposition. The output signals provided by pick offs LPO and RPO are extended over conductors 1252 and 1254 to meter electronics 1256 which processes these signals and generates material flow information that is applied over path 1255 to a utilization circuit (not shown). Also not shown are the meter case and flanges.

Figure 14:
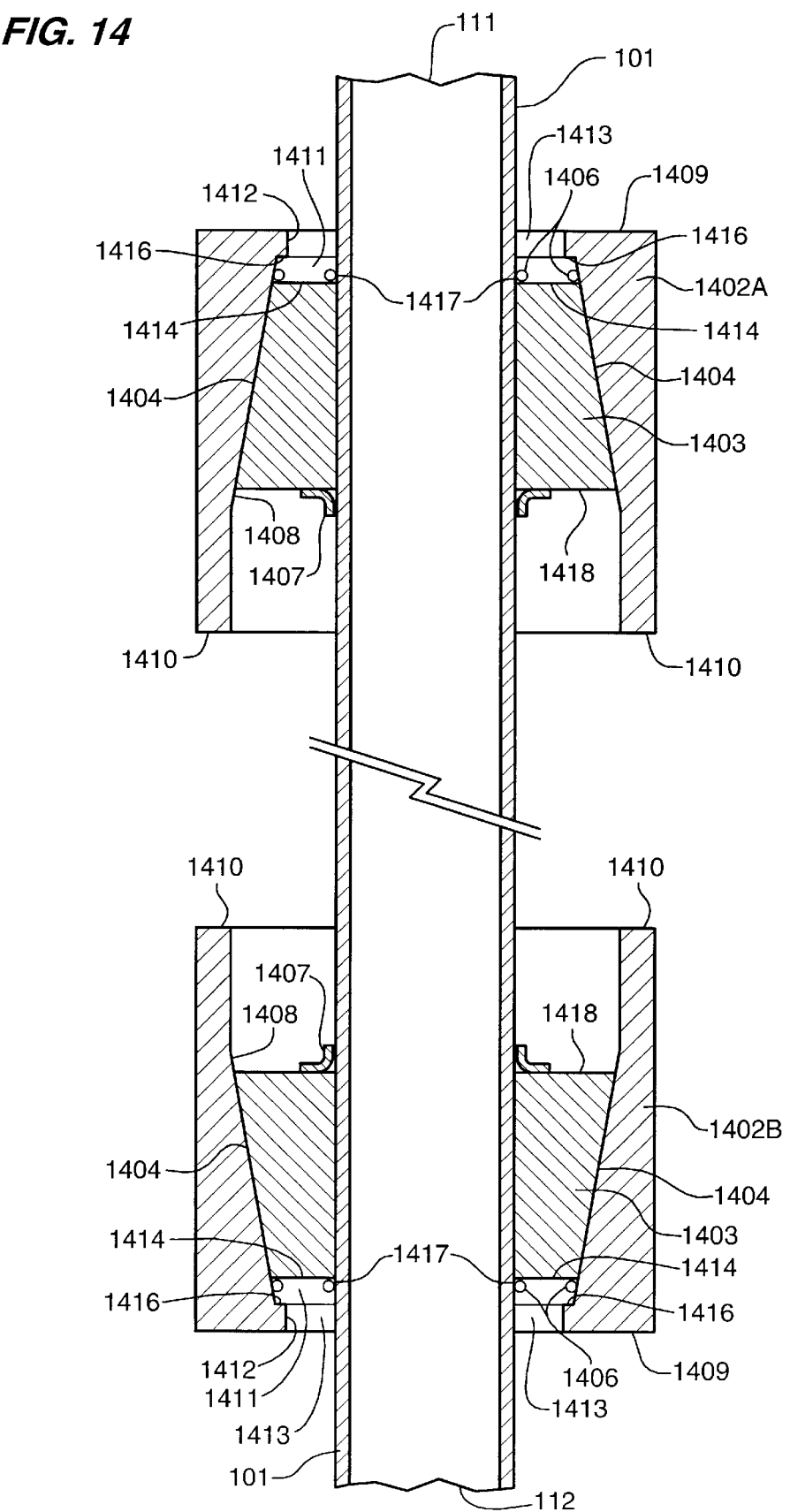
FIGS. 14, 15, and 16 disclose the details of a flowmeter comprising an alternative embodiment.
Figure 15:
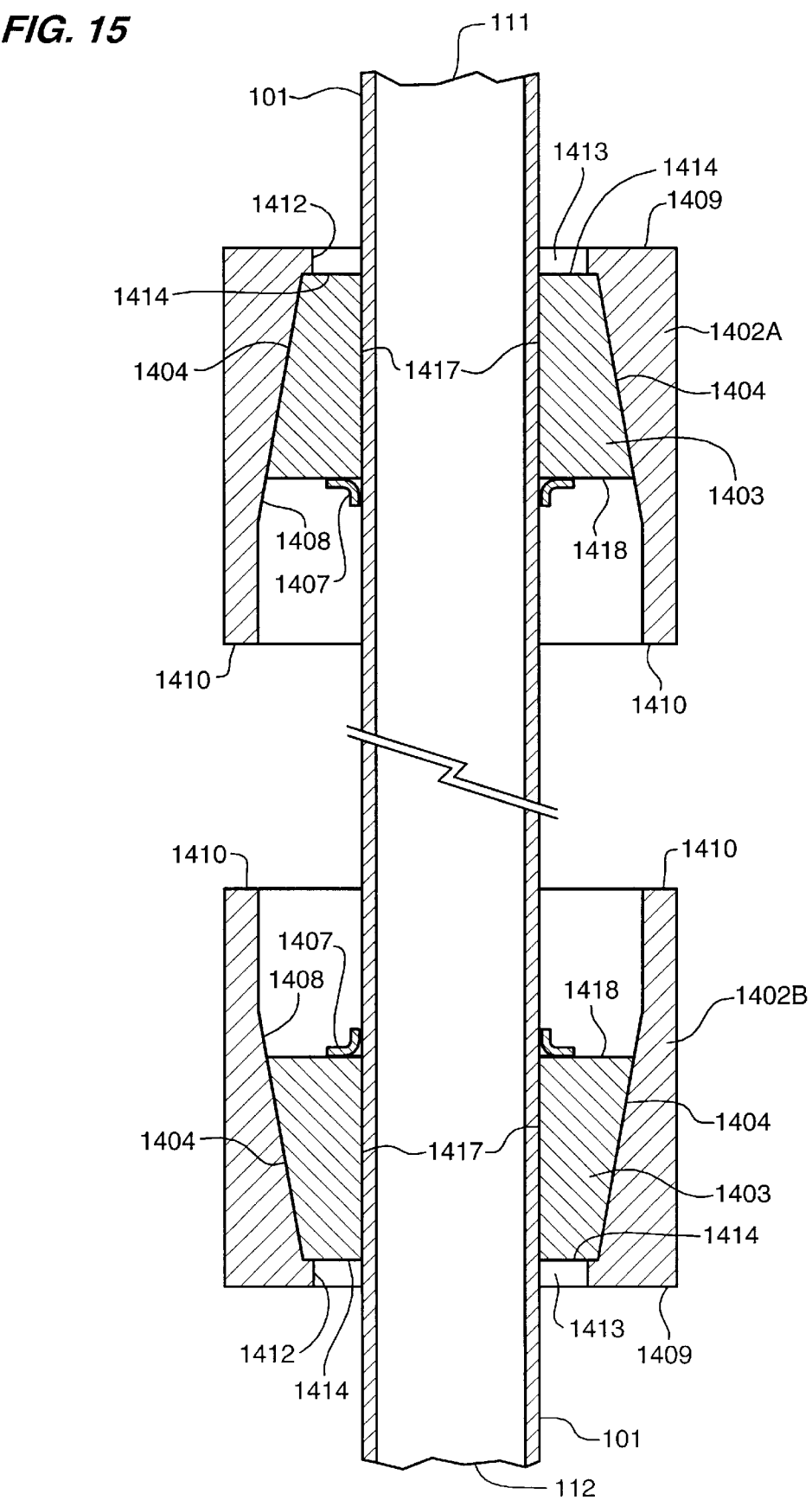
Figure 16:
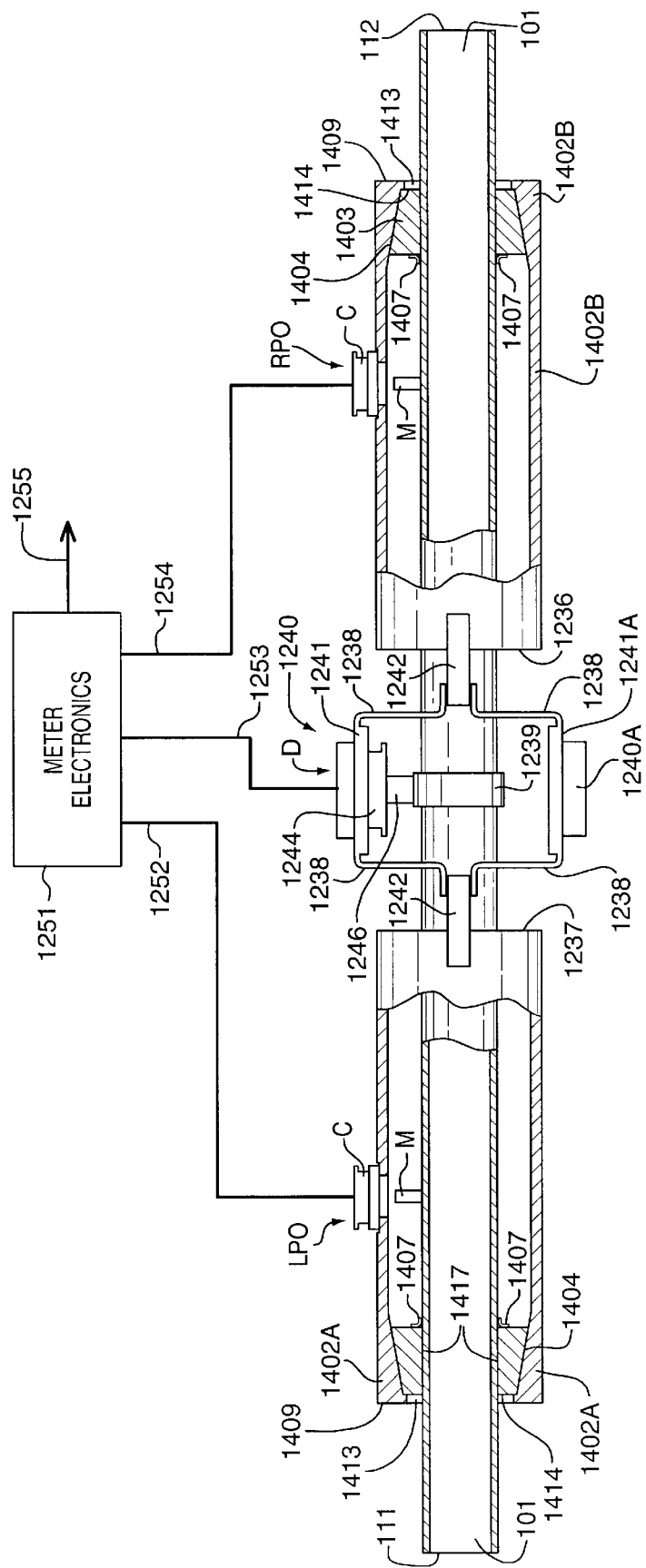

Description of FIGS. 14, 15 and 16

FIGS. 14 and 15 disclose an alternative embodiment of the invention in which the slope of the taper of junction 1404 defining the outer surface of connecting ring 1403 and the inner surface of balance bar segments 1402A and 1402B is opposite from that shown on the embodiments of FIGS. 5 through 13. FIG. 14 discloses a flow tube 101, a surrounding balance bar having an upper segment 1402A and a lower segment 1402B. FIG. 14 also shows two connecting rings 1403 with the upper connecting ring 1403 being surrounded by balance bar segment 1402A and the lower connecting ring 1403 being surrounded by balance bar segment 1402B. Element 1404 is the junction of the tapered outer circumferential surface of connecting rings 1403 with the tapered inner circumferential surface of each balance bar segment.

The axial outer end of each balance bar segment 1402 includes a circular aperture 1413 through which flow tube 101 protrudes. The inner radial surface of this aperture is element 1413. Voids 1411 defines the space between the axial outer extremity of connecting rings 1403 and the axial inner extremity of surface 1412 of void 1413.

FIG. 14 represents the state of the balance bar segments, the flow tube, and the connecting ring prior to the beginning of the brazing process. Elements 1406 are braze material located at the junction 1404 of the surfaces common to the connecting ring 1403 and the balance bar segment, as well as at the junction 1417 common to the circumferential surfaces of connecting rings 1403 and the exterior surface of flow tube 101. Each right angle element 1407 has one leg welded to the exterior surface of flow tube 101 and the other leg supporting an axial extremity 1418 of connecting rings 1403.

FIG. 14 discloses the initial room temperature state of the disclosed elements prior to the initiation of the brazing operation. The elements are assembled prior to brazing by inserting upper connecting ring 1403 into the lower open end portion of balance bar segment 1402A. A connecting ring 1403 is also inserted into the open end 1418 of the lower balance bar segment 1402B. The upper end 111 of the flow tube 101 is then inserted into the center opening of the upper balance bar segment 1402A. Flow tube 101 is further inserted through the center of upper connecting ring 1403 until the horizontal leg of right angle element 1407 engages the bottom surface 1418 of upper connecting ring 1403. The horizontal leg supports the weight of connecting ring 1403 which supports balance bar segment 1402A. At this time, the void 1411 remains and the top surface 1414 of upper connecting ring 1403 remains spaced apart from the lower end 1416 of annular surface 1412 of balance bar segment 1402A. The entire upper assembly is supported by the flow tube via angle elements 1407.

The elements shown on the lower portion of FIG. 14 are assembled in a similar manner. The lower connecting ring 1403 is inserted into the center opening of the lower balance bar segment 1402B and is forced downward to the position shown on lower portion of FIG. 14. Balance bar segment 1402B and its connecting ring 1403 receive the lower portion 112 of flow tube 101 so that the horizontal leg of right angle element 1407 bears against surface 1418 of lower connecting ring element 1403. The force applied by this right angle element is due to the weight of the upper assembly and the flow tube. The weight forces lower connecting ring 1403 downwards to the position shown on FIG. 14. The lower balance bar segment is supported by a fixture 1252 similar to that of FIG. 12. At this time, the void 1411 remains since the end surface 1414 of lower connecting ring 1403 is spaced apart from the end 1416 of surface 1412 of the center opening 1413 of balance bar segment 1402B. Braze material 1406 is then applied to the axially outer extremities of junctions 1404 and 1417. The structure of FIG. 14 is then subjected to a brazing operation.

FIG. 15 discloses the state of the flowmeter elements subsequent to the brazing operation. During the brazing operation the structures are heated to approximately 800° C. This causes the stainless steel balance bar segments 1402A and 1402B to expand radially more than does titanium flow tube 101 and connecting rings 1403. This differential expansion permits balance bar segments 1402 to move axially towards each other in response to the forces applied by the weight of the upper assembly. Balance bar segments 1402 move to the position shown on FIG. 15. At this time, the axial end surface 1414 of connecting rings 1403 engages the notch formed in the axial outer end of the balance bar segments and the axial inner extremity of surface 1412.

The additional force required to move balance bar segment 1402A axially inwards may be provided by any suitable means such as for example a weight similar to element 1251 of FIG. 12. This weight may be placed over flow tube 101 so that it rests against the top surface 1409 of balance bar segment 1402A. This weight forces the balance bar segment 1402A downwards against the upward forces applied by right angle element to the lower surface 1418 of the upper connecting ring element 1403.

The required forces may be applied to the lower elements shown on FIG. 15 by placing the lower end 112 of flow tube in a base such as element 1252 on FIG. 12 and by applying a downward force to the top end surface 1409 of balance bar segment 1402A. The resultant downward force on upper right angle element 1407 forces flow tube 101 downwards so that the horizontal surface of lower element 1407 forces the lower connecting ring 1403 downward to the position shown on FIG. 15.

FIG. 16 shows the flowmeter of FIGS. 14 and 15 equipped with meter electronics 1251 and the spring structure 1238 and its associated elements. This spring structure and its magnets and coils are affixed to balance bar segments 1402A and 1402B after brazing. Spring structure 1240 and meter electronics 1251 performs the same functions already described for the embodiment of FIG. 13.

Figure 17:
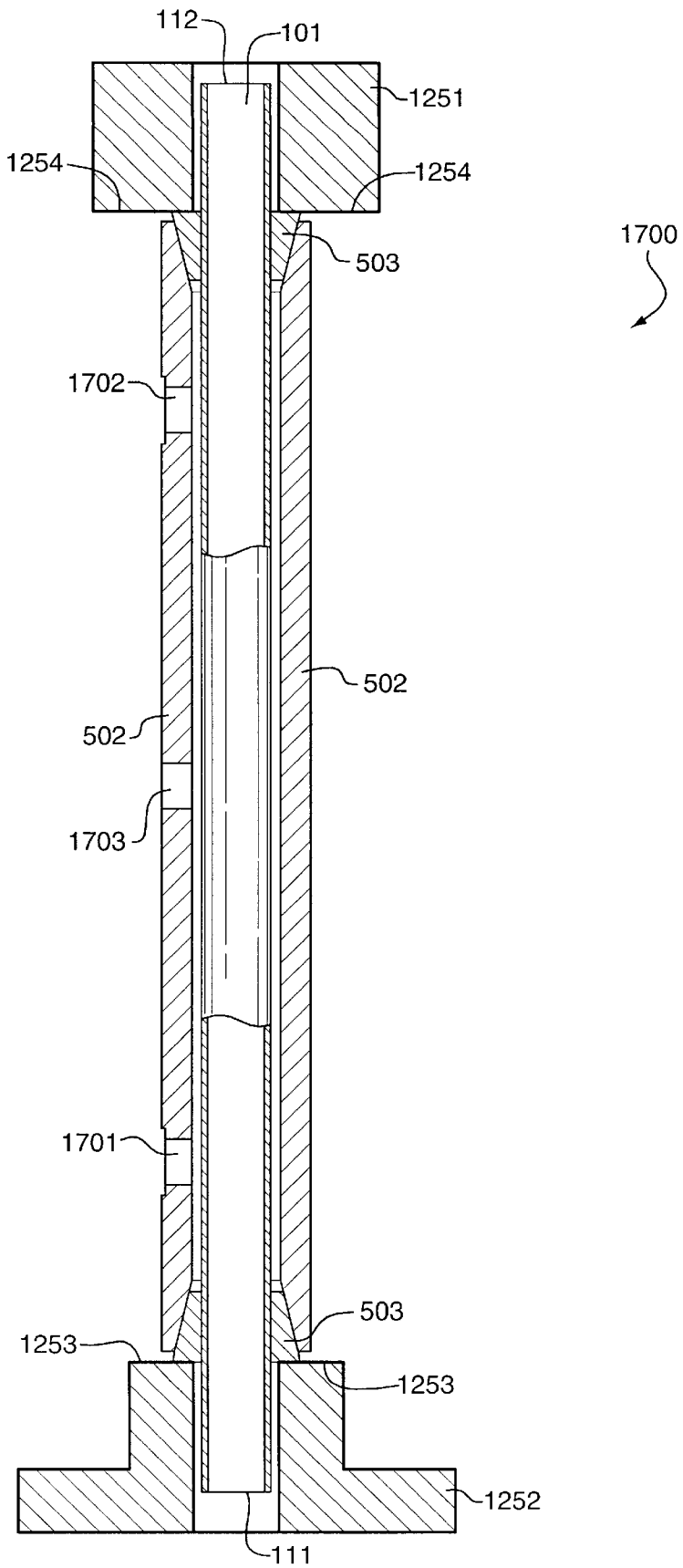
FIG. 17 discloses a Coriolis flowmeter embodying the elements of FIGS. 5–7.

Description of FIG. 17

FIG. 17 discloses a Coriolis flowmeter embodying the elements of FIGS. 5–9 as well weight 1251 and base 1252 of FIG. 12. Thus balance bar 1002 of FIG. 17 is a single integral unit as distinguished from the segmented balance bars of the Coriolis flowmeter of FIGS. 10–16. The balance bar of the Coriolis flowmeter of FIG. 17 may include a step element 808 as shown of FIGS. 8 an 9 or it may be devoid of a step element if desired. The structure of FIG. 17 is similar to that of FIG. 12 except that spring structure 1240 of FIG. 12 has been deleted from FIG. 17. Also, the segmented balance bar 1002A and 1002B of FIG. 12 are replaced by the single integral balance bar 502 on FIG. 17. A single integral balance bar may be used with the ends of balance bar 502 and flow tube 101 undergo localized heating during the brazing operation. Segmented balance bars as shown on FIG. 12 are advantageously used in applications in which the entire flowmeter structure is heated during brazing. In such cases, center spring structure 1240 is required to reduce stress associated with the differential coefficient of expansion between the flow tube and the segmented balance bars.

It is to be expressly understood that the claimed invention is not to be limited to the description of the preferred embodiment but encompasses other modifications and alterations within the scope and spirit of the inventive concept. For example, although the present invention has been disclosed as comprising a part of a single straight tube Coriolis flowmeter, it is to be understood that the present invention is not so limited and may be used with other types of Coriolis flowmeters including single or multiple tube flowmeters of irregular or curved configuration. The invention has been described with reference to the flow tube and connecting ring being titanium and the balance bar being stainless steel. The invention may also be practical using other materials where the thermal coefficient of expansion of the balance bar is different than the flow and connecting ring and/or any other elements such as a tube ring.

What is claimed is:

1. A Coriolis flowmeter having:

a flow tube;

connecting ring means having a center opening through which said flow tube extends;

a tubular balance bar coaxial with said flow tube and surrounding an axial portion of said flow tube;

said balance bar has a greater thermal coefficient of expansion than does said flow tube;

axial end portions of said balance bar coaxial with and surrounding at least a portion of said connecting ring means;

a radial inner circumferential surface of said connecting ring means coupled to an outer circumferential surface of said flow tube;

a radial outer circumferential surface of said connecting ring means is tapered with a decreasing radius in a first direction with respect to the axial center of said flow tube;

a radial inner circumferential surface of said end portions of said balance bar has a taper that matches said taper of said connecting ring means;

said connecting ring means is adapted to be partially inserted into ends of said balance bar prior to a brazing operation and then fully inserted into said balance bar during said brazing operation as said balance bar expands in diameter more than said connecting ring;

said tapered inner circumferential surface of said end portions of balance bar is adapted to be affixed by braze material to said tapered outer circumferential surface of said connecting ring means at the termination of said brazing operation.

2. The Coriolis flowmeter of claim 1 characterized in that said connecting ring means comprises:

a first connecting ring and a second connecting ring each adapted to be brazed to a different end of said balance bar;

a tapered radial outer circumferential surface of said first connecting ring is adapted to be brazed to said tapered radial inner circumferential surface of a first end of said balance bar during said brazing;

a tapered radial outer circumferential surface of said second connecting ring is adapted to be brazed to said tapered inner circumferential surface of a second end of said balance bar during said brazing operation.

3. The Coriolis flowmeter of claim 2 characterized in that said first direction defines a taper that has a decreasing radius towards the axial center of said flow tube.

4. The Coriolis flowmeter of claim 2 characterized in that said first direction defines a taper that has an increasing radius towards the axial center of said flow tube.

5. The Coriolis flowmeter of claim 2 characterized in that said balance bar comprises a first and a second balance bar segments having axial inner end portions coupled to each other by spring means to accommodate a differential axial coefficient of expansion between said flow tube and said balance bar.

6. The Coriolis flowmeter of claim 2 characterized in that said balance bar comprises an integral elongated member.

7. The Coriolis flowmeter of claim 2 characterized in that said radial outer circumferential surface of said flow tube is affixed by braze material to said radial inner circumferential surfaces of said first and second connecting rings.

8. The Coriolis flowmeter of claim 7 characterized in that said balance bar has a thermal coefficient of expansion greater than that of said first and second connecting rings and that said first and second connecting rings have a coefficient of expansion equal to that of said flow tube.

9. The Coriolis flowmeter of claim 7 further including a step on said radial inner end of said tapered circumferential surface of said balance bar that engages an axial inner end of said first and second connecting rings to limit the amount by which said first and second connecting rings can be axially inserted into said balance bar.

10. The Coriolis flowmeter Coriolis flowmeter of claim 2 further comprising:

first and second annular tube rings coaxial with and encircling axial portions of said flow tube;

said axial portions of said radial outer circumferential surface of said flow tube are affixed by braze material to radial inner circumferential surfaces of said first and second annular tube rings;

a radial outer circumferential surface of each of said first and second annular tube rings is tapered with an increasing radius towards said axial center of said flow tube;

said radial inner circumferential surface of said first and second connecting rings has a taper that matches the taper of said first and second annular tube rings and has a diameter that decreases radially towards the axial center of said balance bar;

said radial inner circumferential surface of said first and second connecting rings is adapted to be affixed by braze material to said radial outer circumferential surface of said first and second annular tube rings during said brazing operation.

11. The Coriolis flowmeter of claim 10 further including a step on said radial inner circumferential surface of said balance bar that engages the axial inner end of said first and second connecting rings to limit the amount by which said first and second connecting rings can be axially inserted into said-balance bar during said brazing operation.

12. The Coriolis flowmeter of claim 10 characterized in that said balance bar as a thermal coefficient of expansion greater than that of said first and second connecting rings and that said first and second connecting rings have a thermal coefficient of expansion greater than that of said first and second annular tube rings and that of said flow tube.

13. The Coriolis flowmeter of claim 12 characterized in that said first and second connecting rings and said first and second annular tube rings and said balance bar have different thermal coefficients of expansion.

* * * * *

UNITED STATES PATENT AND TRADEMARK OFFICE
CERTIFICATE OF CORRECTION

PATENT NO. : 6,634,241 B1
DATED : October 21, 2003
INVENTOR(S) : Craig Brainerd Van Cleve It is certified that error appears in the above-identified patent and that said Letters Patent is hereby corrected as shown below:

Title page,
Item [54], Title, replace "METHOD AND APPARATUS FOR BONDING A CONNECTION RING TO A FLOW TUBE AND BALANCE BAR OF A CORIOLIS FLOWMETER" with -- METHOD AND APPARATUS FOR BONDING A CONNECTING RING TO A FLOW TUBE AND BALANCE BAR HAVING DIFFERENT THERMAL COEFFICIENTS OF EXPANSION IN A CORIOLIS FLOWMETER --

Column 2,
Line 23, replace "cm/cm/° C. The difference in expansion rate is thus $9x10^6$" with
-- cm/cm/° C. The difference in expansion rate is thus $9x10^{-6}$ --

Column 7,
Line 58, replace coefficient of expansion of said balance bargenerates a" with
-- coefficient of expansion of said balance bar generates a --

Column 9,
Line 5, replace coefficient of expansion of said balance bargenerates a" with
-- coefficient of expansion of said balance bar generates a --

Column 12,
Line 5, insert the following paragraph:

-- FIGS. 5 and 6 show Coriolis flowmeter structure embodying a first possible exemplary embodiment of the invention. This structure enables a tapered titanium connecting ring 503 to be brazed to a titanium flow tube 101 and to a balance bar 502 formed of material, such as stainless steel having a far higher thermal coefficient of expansion. Flow tube 101 and connecting ring 503 are advantageously formed of titanium or other material having a low thermal coefficient of expansion. Flow tube 101 is comparable to flow tubes 101 shown on FIGS. 3 and 4. Balance bar 502 is preferably formed of stainless steel or other material having a relatively high thermal coefficient of expansion. Surface 505 of balance bar 502 is tapered and comprises one member of the junction 510 between the inner surface of balance bar 502 and the outer surface of connecting ring 503. With this exception, balance bar 102 is otherwise similar to balance bar 502 of FIGS. 3 and 4. Titanium connecting ring 503 has an outer circumferential surface 512 that is inwardly tapered to mate with the taper on the inner surface 505 of the upper portion of balance bar 502. Balance bar 502 may be a single integral structure as shown for the Coriolis flowmeter of FIG. 17 or may alternatively be part of a balance bar having a plurality of segments separated by spring structure comparable to element 1240 of the Coriolis flowmeter shown of FIGS. 12 and 13. --

UNITED STATES PATENT AND TRADEMARK OFFICE
CERTIFICATE OF CORRECTION

PATENT NO. : 6,634,241 B1
DATED : October 21, 2003
INVENTOR(S) : Craig Brainerd Van Cleve It is certified that error appears in the above-identified patent and that said Letters Patent is hereby corrected as shown below:

Column 14,
Lines 7-33, delete the paragraph

Column 15,
Lines 13-28, delete the text

Column 20,
Line 47, replace "said-balance bar during said brazing operation." with -- said balance bar during said brazing operation. --
Line 49, replace "that said balance bar as a thermal coefficient of expansion" with -- that said balance bar has a thermal coefficient of expansion --
Line 54, replace "13. The Coriolis flowmeter of claim 12 characterized in" with -- 13. The Coriolis flowmeter of claim 10 characterized in --

Signed and Sealed this

Twenty-fourth Day of August, 2004

JON W. DUDAS
*Director of the United States Patent and Trademark Office*